(12) United States Patent
Owen

(10) Patent No.: US 6,873,446 B2
(45) Date of Patent: Mar. 29, 2005

(54) REFRACTIVE OPTICAL DEFLECTOR

(76) Inventor: Geoffrey Donald Owen, The White House, Aldington, Evesham, Worcestershire, WR11 5UB (GB)

(*) Notice: Subject to any disclaimer, the term of this patent is extended or adjusted under 35 U.S.C. 154(b) by 0 days.

(21) Appl. No.: 10/432,797

(22) PCT Filed: Nov. 29, 2001

(86) PCT No.: PCT/GB01/05282
§ 371 (c)(1),
(2), (4) Date: Nov. 3, 2003

(87) PCT Pub. No.: WO02/44789
PCT Pub. Date: Jun. 6, 2002

(65) Prior Publication Data
US 2004/0095655 A1 May 20, 2004

(30) Foreign Application Priority Data
Nov. 29, 2000 (GB) .............................................. 0029038

(51) Int. Cl.[7] .......................... G02B 26/08; G02B 3/02; G02B 7/02
(52) U.S. Cl. ...................... 359/210; 359/205; 359/207; 359/717; 359/718; 359/813; 359/824; 359/196
(58) Field of Search ................................ 359/718, 717, 359/793–795, 811, 813, 822, 824, 668, 205, 207, 210, 196; 250/234–236

(56) References Cited

U.S. PATENT DOCUMENTS 4,730,910 A 3/1988 Humphrey .................. 359/601
5,128,795 A 7/1992 Endou et al. ................ 359/207

FOREIGN PATENT DOCUMENTS

GB 445938 4/1936
GB 2324168 10/1998

OTHER PUBLICATIONS

International Search Report Mar. 28, 2002.

Primary Examiner—Georgia Epps
Assistant Examiner—Jack Dinh
(74) Attorney, Agent, or Firm—Ira S. Dorman

(57) ABSTRACT

An optical deflector comprises an aspheric deflecting lens (1, 13) of positive optical power. The deflecting lens (1, 13) has a first relatively short focal length giving rise to a first focal point (3) and a second relatively long focal length giving rise to a second focal point (5). Thus, a divergent beam (7) of light substantially at one of the first and second focal points is focussed by the lens at the other of the first and second focal points. Means (19), such as an electric motor, is provided for rotating the lens about an axis substantially coincident with one of the first and second focal points.

32 Claims, 12 Drawing Sheets

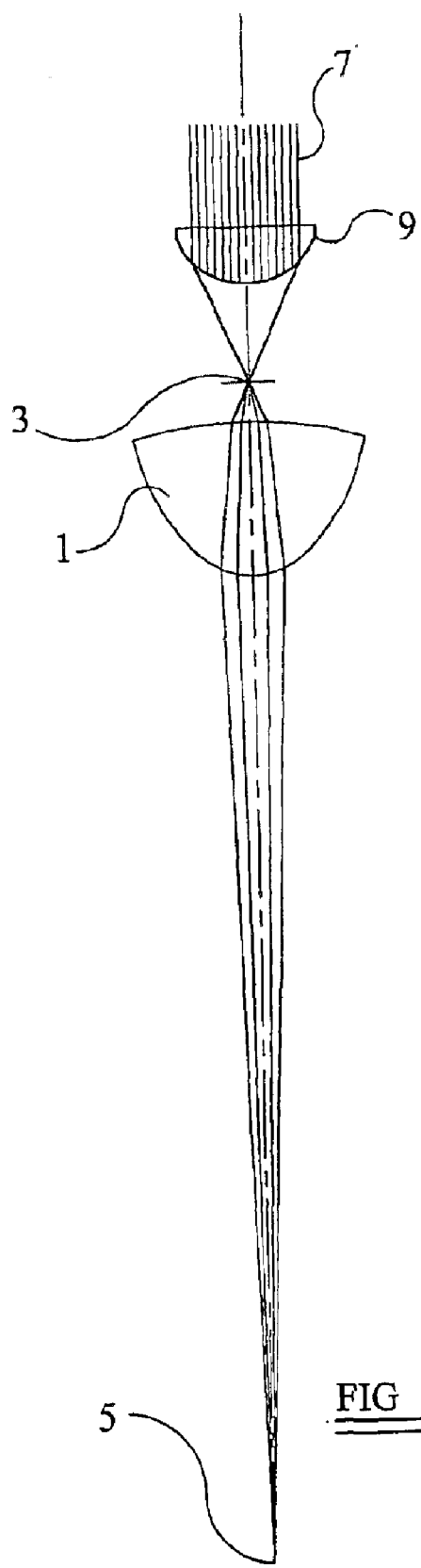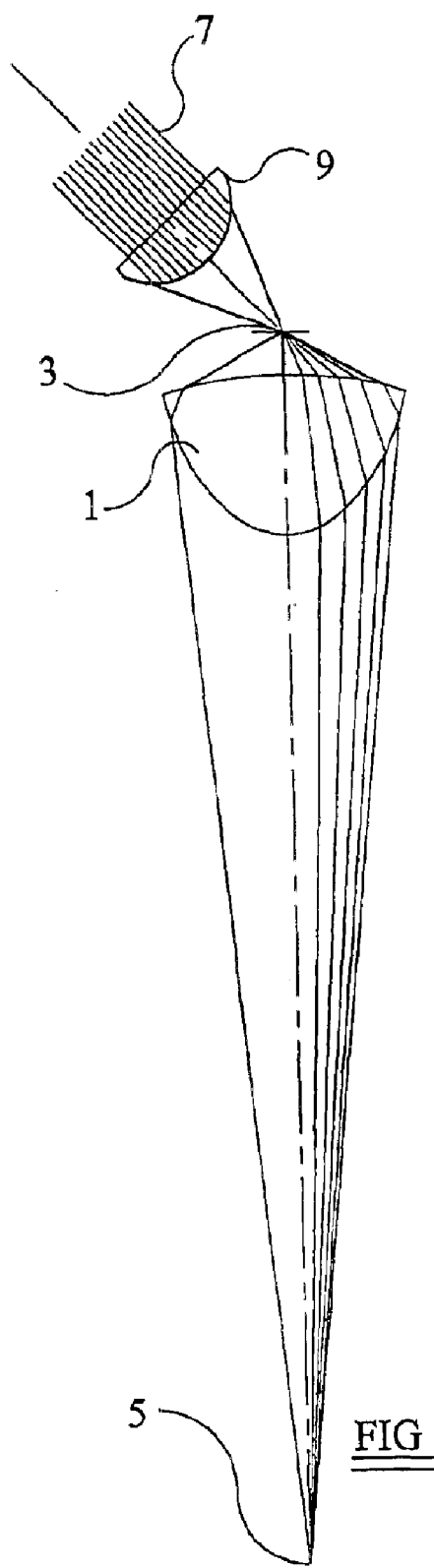
FIG 2A
FIG 2B

31 ← → 31

1

31 ← → 31

1

REFRACTIVE OPTICAL DEFLECTOR

BACKGROUND OF THE INVENTION

This invention relates to a refractive optical deflector for use in optical scanning and other applications.

There are two fundamental types of optical scanning: these are input scanning and output scanning.

Input scanning occurs when an existing image, such as on celluloid film or paper, forms a target image. The target image is illuminated and electromagnetic radiation, such as light, reflected from or transmitted through the target image is scanned into a machine and then digitised. Common examples include facsimile machines and scanners attached to computers.

Output scanning is the reverse of input scanning. In the case of output scanning a target object in the form of a light-sensitive film plate, light-sensitive paper sheet, or other radiation sensitive device, is exposed to a highly focussed and modulated radiation (light) source which traverses, or scans, the target object thereby imprinting an image onto the target.

Conventional technology for exposing an image on a light-sensitive plate in output scanning begins with a light source, such as a laser or a light-emitting diode capable of emitting a fine collimated beam. In the case where the image is required to be of high quality, the laser beam is first expanded through a beam expander and is subsequently reflected off a rotating, or oscillating, beam deflector, such as a rotating polygon or a galvanometer deflector. The deflector causes the beam to scan along an image plane, albeit with a radial focal plane. Finally, the beam is generally passed through a telecentric field-flattening lens, or a special lens known as an F-theta lens, which focusses the light onto a flat focal plane by extending the focal length towards the periphery of the scan.

There are several ways in which input scanning can be effected to scan a target image into a computer or the like. Where high resolution imaging is required, a typical input scanner employs a laser as a radiation (light) source. Indeed, for three-colour imaging three lasers of different frequencies may be used. In the case of a drum scanner, a target image in the form of a film or the like is mounted on a cylindrical drum which is rotated about its axis. The lasers remain fixed with their beams focussed on the target film. The rotating (or spinning) drum avoids the need for a deflector mechanism. As the laser light passes through the film, the intensity of the beam is attenuated according to the opacity of the film and the transmitted beam is detected by stationary detectors, such as photodiodes. The output from the detectors is digitised and transmitted to the computer.

It is a disadvantage of known input and output scanners that the optical deflectors they incorporate require a substantial number of optical and mechanical components which give rise to undesired complexity and degraded optical performance.

It is therefore an object of the present invention to provide an optical deflector which overcomes or at least reduces the disadvantages of known deflectors.

SUMMARY OF THE INVENTION

According to the present invention there is provided an optical deflector comprising an aspheric lens of positive optical power and having a first relatively short focal length giving rise to a first focal point and a second relatively long focal length giving rise to a second focal point, such that a divergent beam of light substantially at one of the first and second focal points is focussed by the lens at the other of the first and second focal points, and means for rotating the lens about an axis substantially coincident with one of the first and second focal points.

The lens may be shaped to increase beam divergence with increasing scan angle.

The second focal point may be at infinity.

The or each lens may be rotatable continuously about the axis. Alternatively, the or each lens may be reciprocable about the axis.

The deflecting lens may be rotationally symmetrical or cylindrical.

The optical deflector may include focussing means such that a divergent beam focussed substantially at the first focal point is collimated at that side of the focussing means remote from the deflecting lens. At least one focus-desensitising means may be included at that side of the focussing means remote from the deflecting lens. The focus-desensitising means may comprise a first stationary focus-desensitising lens and a second focus-desensitising lens movable in the axial direction. The second focus-desensitising lens may be at that side of the first focus-desensitising lens remote from the focussing means.

The optical deflector may including means for adjusting the focussing means and/or the focus-desensitising means so as to alter the depth of the second focal point.

Where the optical deflector is to be incorporated into a scanner, the deflecting lens may be rotatable about an axis substantially coincident with the first focal point. The lens may be shaped to determine the configuration of the focal plane including the second focal point.

A further, stationary aspheric lens may be positioned intermediate the deflecting lens and the second focal point. The first focal point may lie on the optical axis of the further lens. The further lens may be shaped to determine the configuration of the focal plane including the second focal point. The focal plane may be configured to be planar, convex, concave or any other desired configuration. The further lens may be rotationally symmetrical or cylindrical.

A plurality of lenses may be provided, each rotatable about an axis substantially coincident with a common first focal point. The lenses may be arranged in a cluster which may comprise three equiangularly spaced lenses.

Means may be provided for adjusting each deflecting lens towards and away from the axis of rotation.

The optical deflector may include means for adjusting each deflecting lens in a direction parallel to the axis of rotation. Additionally or alternatively, the optical deflector may include means for adjusting tilt of each deflecting lens relative to the axis of rotation.

Where the optical deflector is to be incorporated into an output scanner, the divergent beam of light may originates substantially from the first focal point. The optical deflector may include a source of collimated light. The source of collimated light may comprise a source of laser light.

Where the optical deflector is to be incorporated into an input scanner, the divergent beam of light may originate substantially from the second focal point. The optical deflector may include an optical detector located substantially at the first focal point. The optical detector may comprise an array of detectors, such as a linear array CCD sensor.

Where the optical deflector is to be incorporated into a microscope, the deflecting lens may be rotatable about an axis substantially coincident with the second focal point.

For a better understanding of the present invention and to show more clearly how it may be carried into effect reference will now be made, by way of example, to the accompanying drawings in which:

BRIEF DESCRIPTION OF THE DRAWINGS

FIGS. 2A and 2B illustrate ray tracings through an aspheric lens for use in a refractive optical deflector according to the present invention, demonstrating how different angles of incidence do not change the second focal condition;

DETAILED DESCRIPTION OF THE INVENTION

Figure 1C:
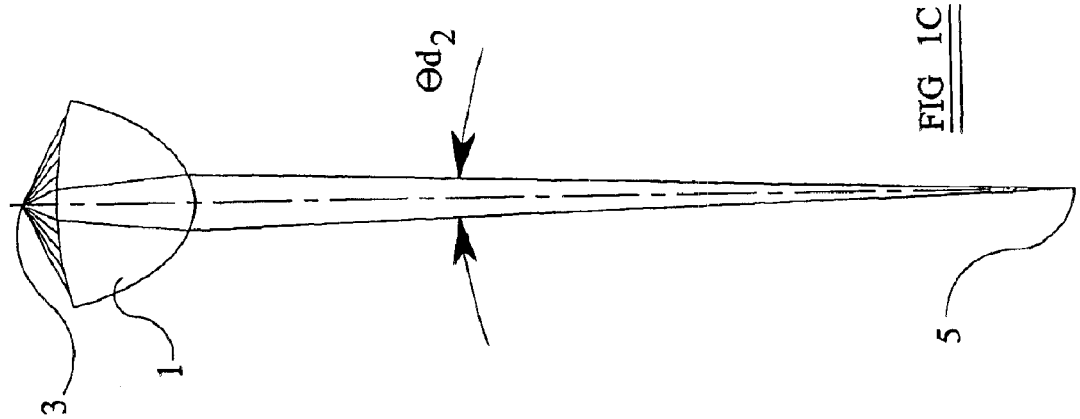
FIGS. 1A to 1C illustrate ray tracings through an aspheric lens for use in a refractive optical deflector according to the present invention, demonstrating the effect of the angle of divergence.
Figure 1B:
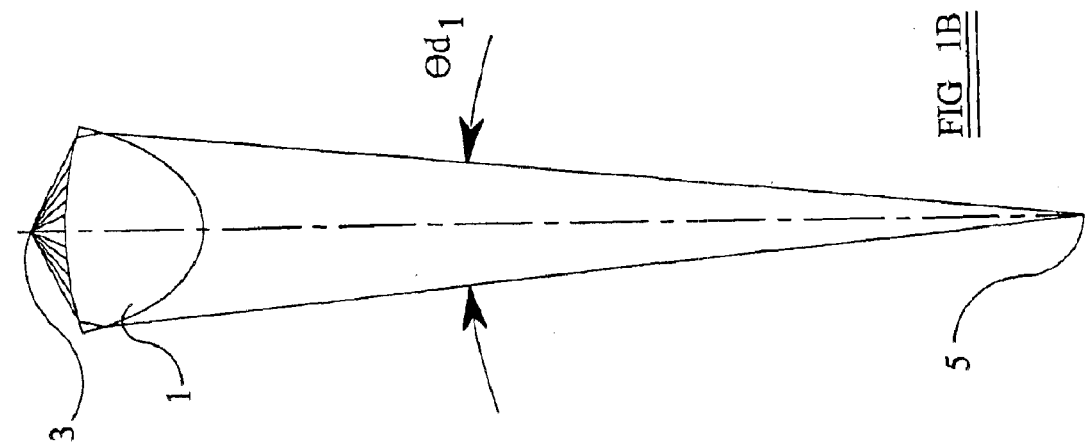
Figure 1A:
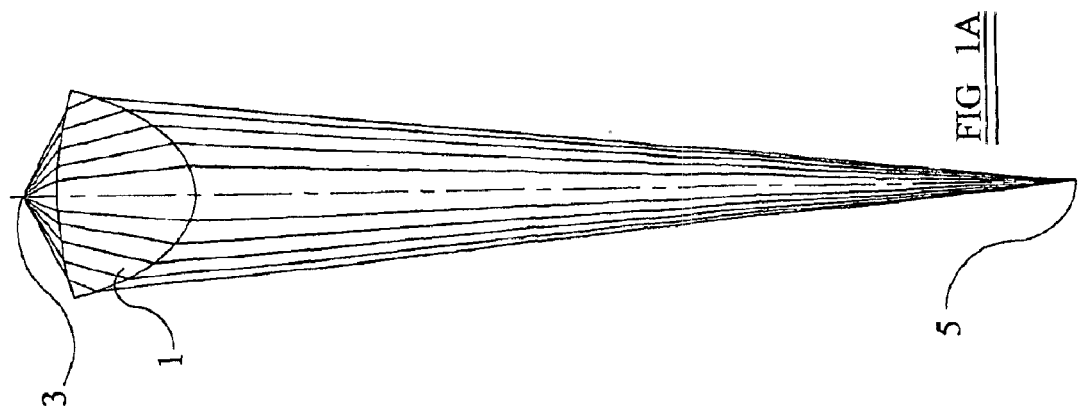

FIGS. 1A, 1B and 1C show an aspheric lens 1 of positive optical power which exhibits no spherical aberration. The inner focal length of the lens 1 is very short and the lens focusses at a point 3. The outer focal length of the lens is somewhat longer than the inner focal length and the lens focusses at a point 5. Thus a divergent beam of light (which may include visible radiation, infra-red radiation and ultra-violet radiation) effectively originating from the focal point 3 will, irrespective of the aperture used, focus at the focal point 5. However, the divergence angle has an effect on the resolution available in that a wide divergence angle $\theta d_1$ as shown in FIG. 1B gives rise to a smaller spot diameter than does a narrow divergence angle $\theta d_2$ as shown in FIG. 1C. For example, if the full lens is used as shown in FIG. 1B, then a spot of diameter about 5 microns is possible for a divergence angle of about 10 degrees, while if only part of the lens is used a spot diameter of about 20 microns is possible for a divergence angle of about 3 degrees. Thus, a somewhat simpler lens can be employed if the required resolution is relatively low.

Such an arrangement allows higher resolution (smaller pixel diameter) than conventional deflectors. Substantial beam deflection angles can be provided in an optical system of shorter focal length than conventional optical scanning systems.

Moreover, the focal point of origin is absolute and fixed in space. Thus, the point of origin is not subject to the positional distortions associated with reflective deflector systems.

FIGS. 2A and 2B show an aspheric lens 1, such as that of FIG. 1, in which a collimated light beam 7, for example a laser beam, is focussed by a lens 9 at or near the inner focal point 3 of the lens 1 such that, for any given angle of rotation, the subsequent diverging beam impinges on part only of the surface of the lens 1.

FIG. 2A shows the situation where the optical axis of the diverging beam is coincident with the optical axis of the lens 1, such that a beam of small divergence angle is focussed at the outer focal point 5 of the lens 1.

FIG. 2B shows the situation where the optical axis of the diverging beam is at an acute angle relative to the optical axis of the lens 1. However, because the incident beam is focussed at the inner focal point of the lens 1, this being the rotational and optical axis, the resulting beam of small divergence angle is still focussed at the outer focal point of the lens 1.

Thus, FIG. 2 demonstrates that a divergent beam of light incident on the lens 1 and having a focal point coincident with the inner focal point of the lens 1 will always be focussed at the outer focal point of the lens 1 irrespective of the part of the surface lens on which the beam is incident. This means that rotation of the collimated beam 7 relative to the lens 1 will have no effect on the spatial position on the point at which the beam is focussed provided the collimated beam is converted to a convergent/divergent beam having a focal point substantially coincident with the inner focal point 3 of the lens 5. In other words, in relation to an optical deflector incorporated into a scanner, provided the light beam is focussed substantially at the short conjugate, the projection angle is irrelevant to the generation of an image substantially at the longer conjugate.

Figure 3:
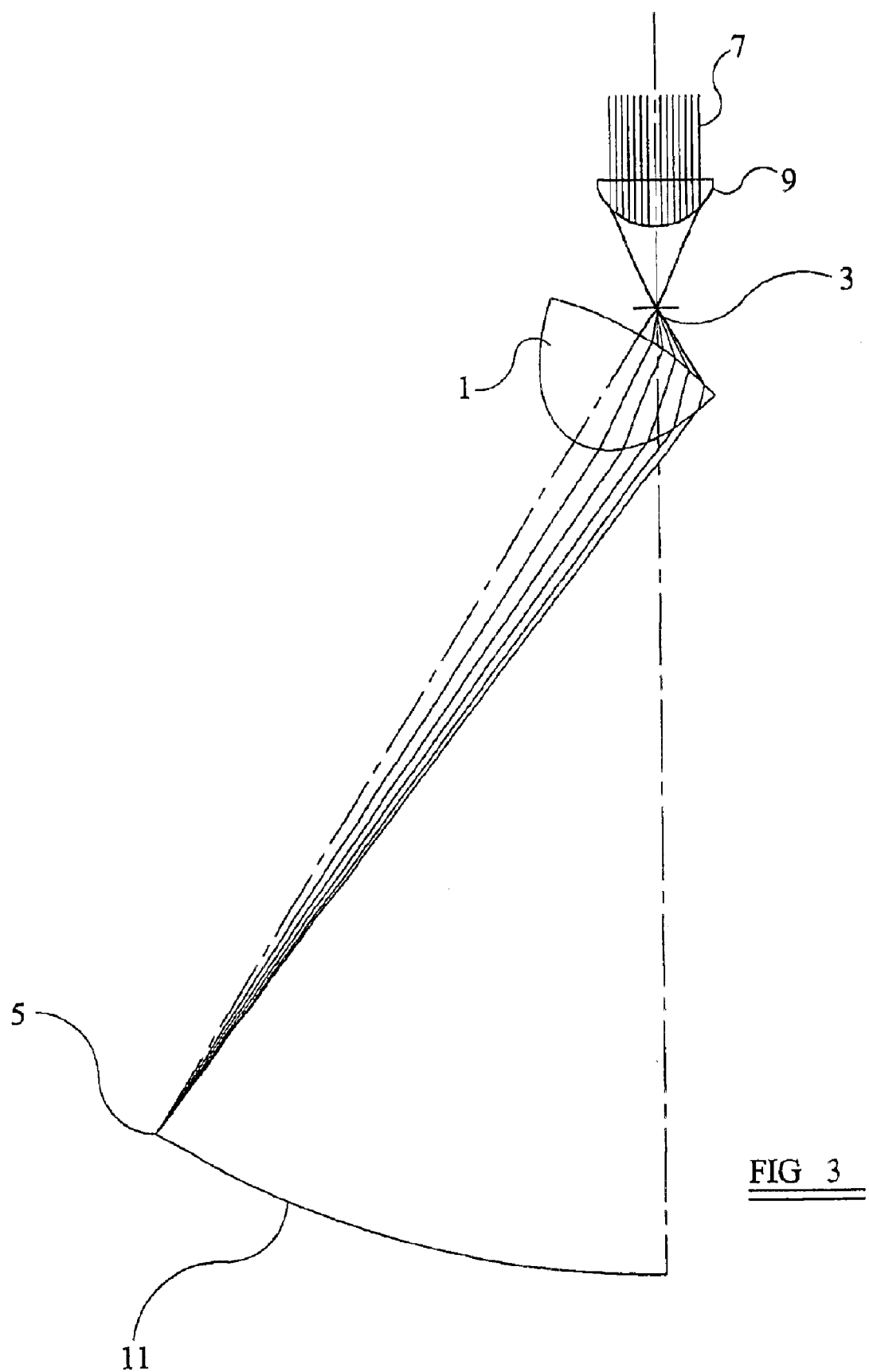
FIG. 3 illustrates a ray tracing through an aspheric lens for use in a refractive optical deflector according to the present invention, illustrating the effect of rotation of the lens.

FIG. 3 shows the effect of rotation of the lens 1 relative to a collimated beam 7 from a stationery light source. That is, the light source is fixed and the lens 1 is rotated about the focal point 3. The distance at which the beam is focussed remains constant, but the beam is deflected through an angle. Thus, the point of focus 5 traces out a curved path 11. Therefore, the image appears to rotate and is traced into the plane of the path 11. Because the light beam 7 is projected into the lens 1 at the focal point 3 thereof, the optical system is devoid of astigmatism and coma, that is there is no off-axis projection of light within the optical system. It should be noted the deflection angle is a function of the ratio of the two conjugates, i.e., the shorter the inner focal length of the lens (to the focal point 3) the greater the deflection angle. The limits of performance lie in two parameters: as the inner focal length decreases the angle of incidence will eventually rise to a value at which the light reflects rather than refracts, and as resolution requirements increase the working aperture also increases, thereby limiting deflection angle.

Figure 4:
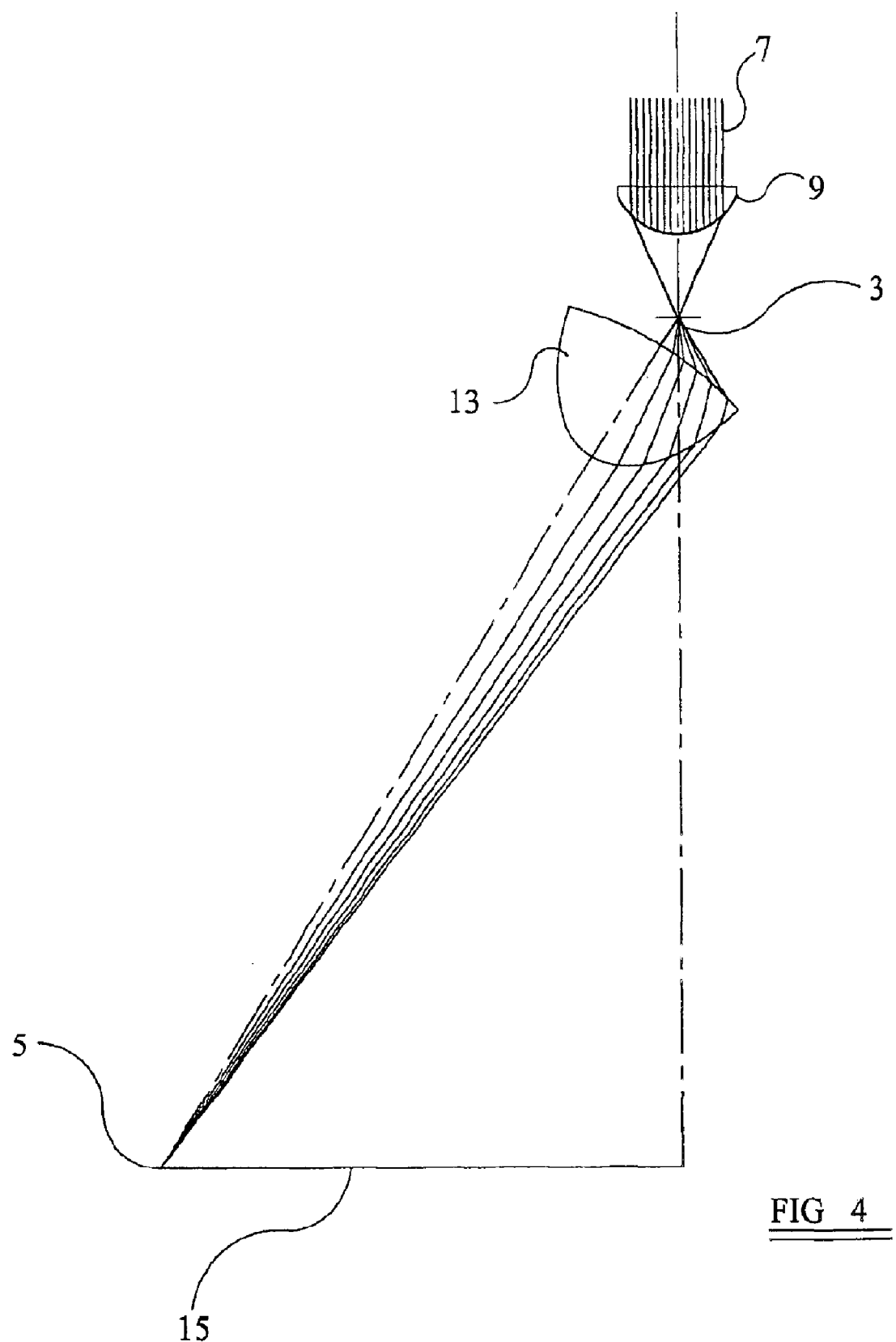
FIG. 4 illustrates a ray tracing through an aspheric lens of somewhat different configuration to that of FIG. 3.

FIG. 4 is similar to FIG. 3 and again shows relative rotation of a lens 13 relative to the collimated beam 7. However, the profile of the lens 13 differs from that of lens 1 to cause the focal length to increase with increasing deflection angle. Thus, the point of focus 5 traces out a flat path 15, generally referred to as the F-theta condition, which is required for flat bed scanning. Clearly further lens profiles can be provided in order to generate other paths for the focal point 5. For example the focal point 5 could be arranged to project an image onto a convex surface.

While the lens 13 of FIG. 4 can be manufactured, the optical performance of the lens can be expected to deteriorate with increasing scan angle (or divergence from the optical axis of the collimated beam 7).

Figure 5:
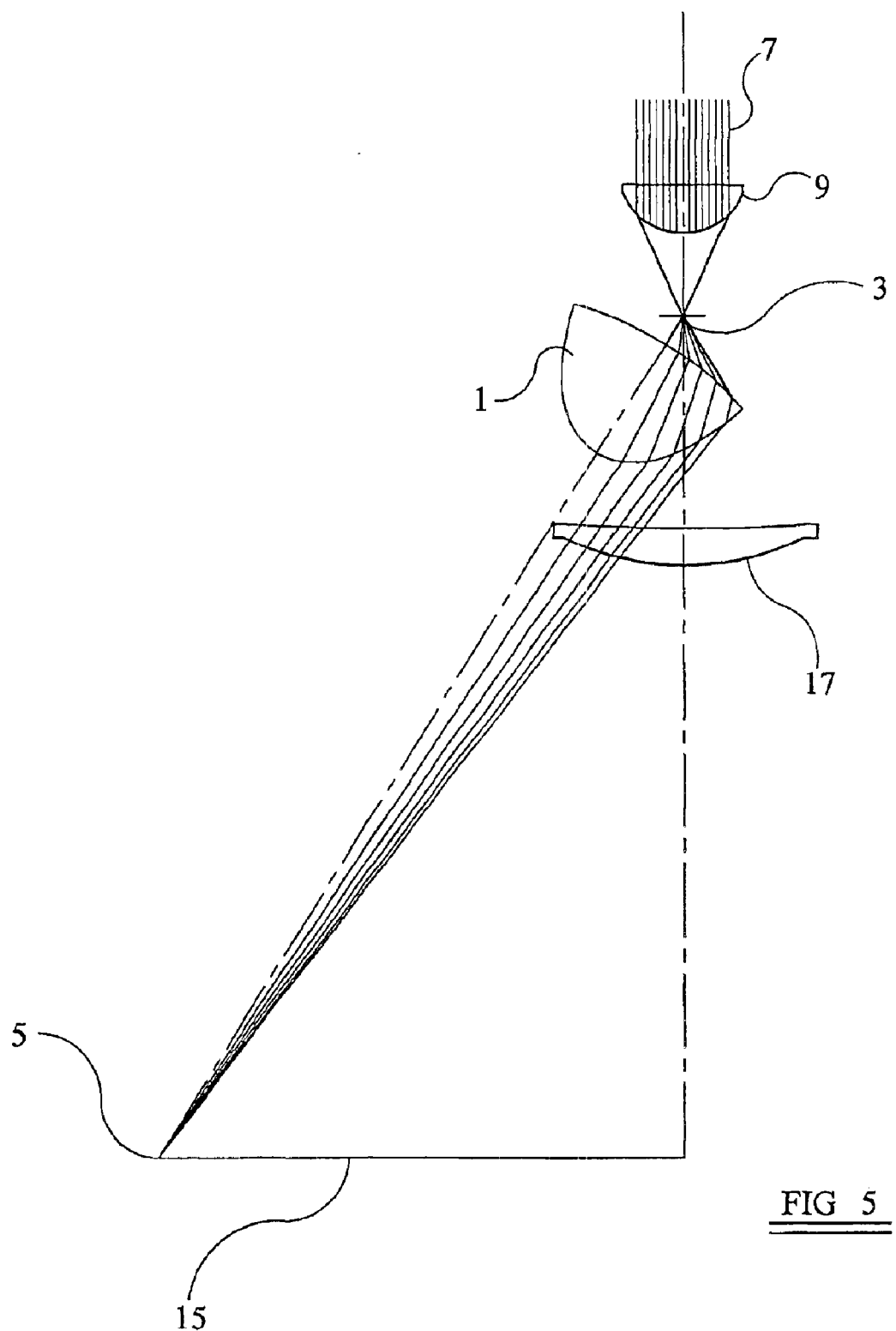
FIG. 5 illustrates an alternative to FIG. 4, with an additional aspheric lens being located between the lens of FIGS. 1 to 3 and the longer conjugate.

An optically more straightforward method for modifying the path of the focal point 5 is to incorporate between the lens 1 and the focal point 5 a further aspheric lens 17 on the optical axis of the collimated beam 7 so as to modify the beam of light emerging from the lens 1 in order to correct residual optical aberrations at extreme deflection angles. Depending on the configuration of the lenses 1 and 17, it is possible to generate a flat path 15 as shown in FIG. 5, or almost any shape of path desired including concave (including constant radius) paths, convex paths and even focal planes with transitional gradients. Thus, the optical power of the further lens varies with deviation from the optical axis of the collimated beam 7: indeed the optical power of the further lens 17 may be zero at the optical axis of the beam 7.

Ideally, the light beam passing through the lens 1, 13 will have a numerical aperture in the range from 0.05 to 0.35.

Optically, wide deflection angles would normally result in highly elliptical pixels towards the periphery of the scan. This is because the projection angle becomes relatively acute, especially where very short focal lengths and wide deflection angles are employed. If desired, the lens 1, 13 can be shaped to increase beam divergence with increasing scan angle: that is, in effect the beam is increasingly elliptical at increasing scan angle with the result that it generates a circular spot on the target focal plane. In this way, pixel ellipticity can be corrected at extremes of scan angle and a circular spot can be maintained throughout a scan. It is therefore possible to provide a linear image with increased deflection angle and to avoid the image being stretched with increased deflection angle. This feature is normally associated with an electronic correction method referred to as pixel-clock correction.

A major problem associated with flat bed scanning is scan non-linearity. A motor scans with constant angular velocity and as a result the associated image is progressively stretched at the focal plane as the angle of deflection increases. Correction is normally accomplished electronically with pixel-clock correction. That is, the electronic systems modulate the data stream at an increased rate at greater deflection angles to accommodate and correct the image distortion. The non-linearity associated with conventional scanning optics can be configured out of the aspheric lenses described herein thereby allowing a purely optical linear scan.

The optical deflector of the present invention operates differently to known flat bed scanning in that the deflecting lens 1 or 13 slows beam deflection at greater deflection angles. The middle section of a scan can exhibit a peak error of up to about 3 percent deviation from the required deflection angle, while on average about 60 percent of an image can be scanned with less than 2 percent error. In many cases this is sufficiently small to be ignored or can be corrected in software rather than with the use of expensive electronic systems. However, in applications in which substantially no visible error is acceptable, a further lens can be added to correct for beam deflection or, if other parameters, such as duty cycle and/or pixel ellipticity, can be relaxed somewhat then the peak error drops to less than 2 percent.

It has been found that a deflecting lens 1 or 13 can scan angles up to the range of 90 to 110 degrees and this gives rise to the possibility of high duty cycles. The duty cycle is the proportion of a single motor revolution that is translated into imaging work.

In demanding applications it is preferred to arrange three deflecting lenses in a circular cluster around an axis of rotation as will be shown in detail hereinafter. In this way, three scan lines can be made during each revolution of the cluster, with each lens being responsible for 120 degrees of work. Each lens can be used up to its optical edge and therefore the only time the lenses are not working is when the beam moves from one lens to the next. Typically, in demanding high-resolution applications (employing a relatively wide divergence angle) 10 percent of scan time is lost per lens, resulting in a duty cycle of 70 percent. In low-resolution applications the duty cycle can be about 90 percent with the result that overall scan times can be significantly reduced compared with conventional optical scanning systems.

It will be appreciated the optics of FIGS. 1 to 5 are reversible and the arrangements can therefore be used for both input scanning and output scanning. That is a beam of light, such as laser light, can be fed through the optics to project an image onto a focal plane, or alternatively an illuminated target image can be scanned through the lenses 1 and 13 onto a fixed photo-sensitive detector, such as a photodiode, at the inner focal point 3. Indeed, it is possible to combine the two types of scanner. In such a case the incorporation of a beamsplitter permits a single set of optics to fulfil both functions simultaneously if required, allowing a user both to see the target and to fire a laser along the same path. Such a combined scanner is particularly useful in medical applications where it is necessary or desirable to be able to view a target which is being treated with a laser.

It will further be appreciated that rotationally symmetrical lenses 1 are not essential. For example, cylindrical lenses 1 can be employed. In the example of a scanning microscope, the target focal plane could be perfectly radial and the further lens 17, where provided, could take the form of a lens that initially magnifies the target and then presents the magnified image on the radial focal plane, allowing the magnified image to be scanned by a cylindrical deflector lens 1. This gives the advantage that the second focal plane is a line rather than a point and can be imaged onto a linear array CCD sensor thereby allowing a "swathe" of target to be imaged rather than a line of digitised points.

In a further modification, the outer focal length, giving rise to the focal point 5, is set to infinity with the result that the imaging capability is that of a wide-angle tracking camera.

The deflection angles achievable with the lenses 1 and 13 are high compared with conventional technology and this allows shorter overall focal lengths to be used. Typically, scan angles of 60 degrees to 80 degrees are readily achievable, while scan angles of 100 degrees or more can be achieved with some degradation in resolution.

Because fewer optical components are required in the deflector according to the present invention, the optical efficiency (light losses due to absorption) is higher than in conventional deflectors. The higher optical efficiency allows lower power laser or other light sources to be employed.

Figure 6:
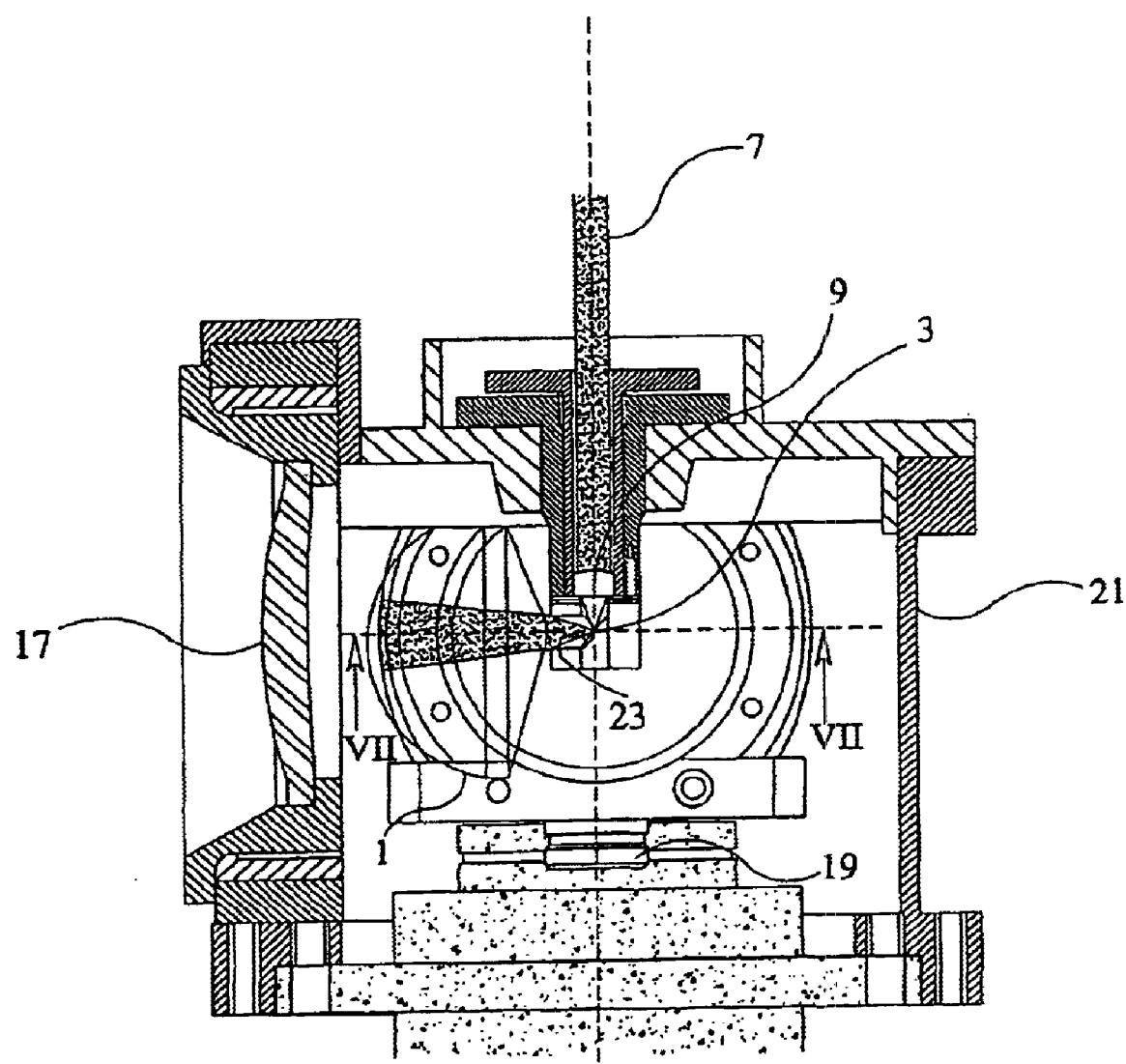
FIG. 6 is a cross-sectional view of one embodiment of a refractive optical deflector according to the present invention.
Figure 7:
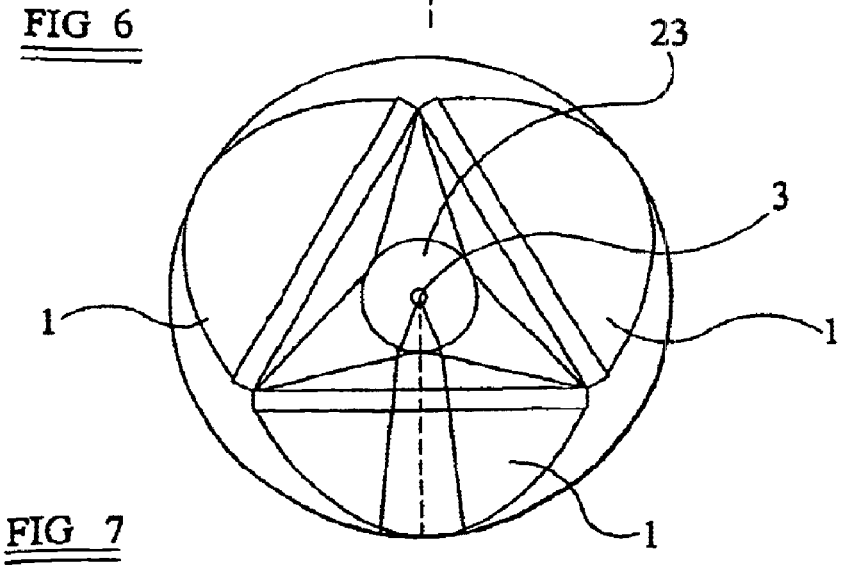
FIG. 7 is a cross-section along the line VII—VII shown in FIG. 6.

FIGS. 6 and 7 show one embodiment of a refractive optical deflector in which three aspheric deflecting lenses 1 are arranged in a cluster with the lenses spaced at 120 degree intervals so as to be rotatable about a common axis on which the inner focal point 3 of all three lenses 1 is located. The cluster of lenses is rotatable by means of an electric motor, such as an air bearing motor, shown diagrammatically at 19. The motor and lens cluster are mounted within a housing 21 with the further static aspheric lens 17 mounted in one side of the housing so as to further refract light passing through each of the lenses 1 in turn. The overall external profile of the cluster of lenses 1 can approximate to circular, thus allowing almost silent scanning to be accomplished. Such an arrangement is aerodynamically quieter than known rotating polygon mirrors or galvanometer deflectors.

A collimated and monochromatic beam 7 of light enters through the top of the housing 21, the beam having a diameter of, for example, 5 mm and being focussed by lens 9 onto or near an optically flat mirror 23 which is located at 45 degrees and which is axially coincident with the focal point 3. The mirror 23 deflects the convergent/divergent beam through 90 degrees along the optical axis of the further lens 17. Thus, as the motor 19 spins the cluster of lenses 1, each lens 1 passes in sequence through the divergent beam with the beam scribing an arc across the width of the lens and being deflected as explained hereinabove, the angle of deflection being dependent on the instantaneous rotational position of the lens relative to the beam. The deflected beam then passes through the further lens 17 so as to generate an image on the shape of focal plane required, for example on a flat plane.

The further lens 17 is optically very weak, but serves a number of purposes. Primarily, the further lens 17 cleans up the pixel quality at the periphery of the scan by correcting a small amount of coma and astigmatism that occurs in high-resolution/short focal length applications.

The further lens 17 also helps with scan linearity.

The refractive optical deflector of the present invention provides a more compact, self-contained apparatus than has hitherto be practicable. This is because there is no longer any need for the conventional F-theta lens which is generally placed a substantial distance from the deflector lens. Further, the refractive optical deflector according to the present invention does not require the input beam to be significantly expanded, either eliminating the conventional beam expander entirely, or substantially reducing the beam expansion ratio required.

The duty cycle, or amount of scanning work achieved per deflector cycle, is significantly higher than is the case with conventional beam deflectors, with values up to 80 percent being achievable in high resolution applications, and nearly 100 percent in less demanding applications.

Although FIGS. 6 and 7 show a refractive optical deflector incorporating a rotating cluster of three lenses 1, it will be appreciated rather simpler optical deflectors can be provided incorporating only a single deflecting lens 1. Indeed, deflectors can be constructed with a wide range of numbers of lenses. Where only a single lens 1 is provided it will be appreciated it is not necessary for the beam 7 to be folded through 90 degrees and that the beam can be projected directly onto the surface of the lens 1. Further, the lens or lenses 1 are not necessarily required to spin about an axis, but alternatively can reciprocate or oscillate backwards and forwards. Such an arrangement allows the duty cycle to approach 100 percent, although raster scanning is no longer available.

Figure 8A:
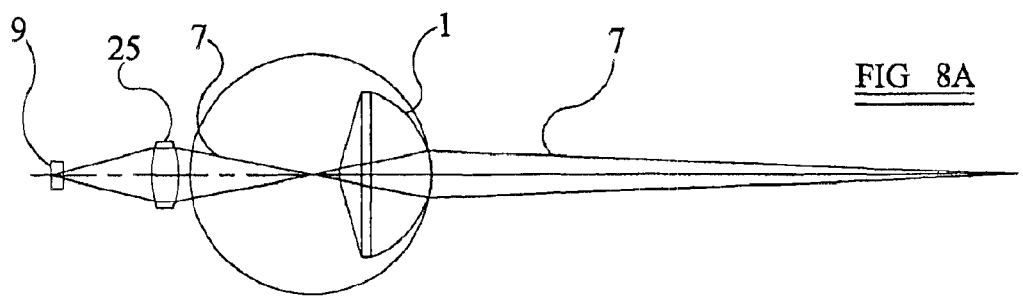
FIGS. 8A and 8B diagrammatically illustrate scanning with a single deflecting lens 1.
Figure 8B:
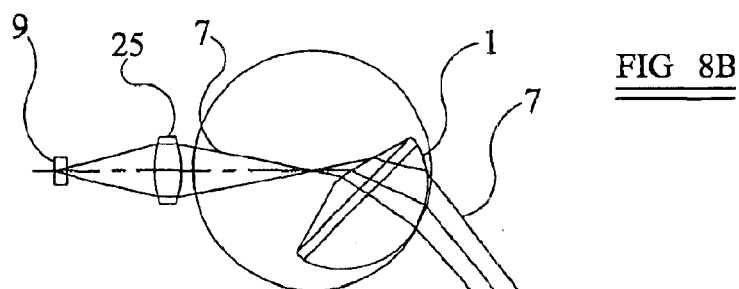

FIGS. 8A and 8B diagrammatically illustrate scanning with a single deflecting lens 1, with FIG. 8A showing the arrangement with no beam deflection and FIG. 8B showing the arrangement with significant beam deflection. As can be seen, with the aid of another lens 25, the focus lens 9 can be arranged to be outside the area swept by the rotating components and folding of the beam 7 is not necessary.

Because the deflector according to the present invention can be applied to rotational movement, the scan frequency is limited only by the mechanical inertia of the rotating components and the limits this places on the lenses. Scan speeds can therefore be higher than in conventional deflectors.

Although the invention as described hereinabove refers to the use of only one spatial axis, a rotationally symmetrical deflecting lens can rotate to any angle about the optical centre. That is, the axis about which the lens is rotated need not be stationary. By rotating the deflecting lens through a plane orthogonal to the spin plane described herein, the optics can generate a true two-dimensional scan. This eliminates the need for roller mechanisms or moving carriages to index the target. Orthogonality is not optically essential however, merely mechanically desirable. The deflecting lens can produce or generate an image at any angle relative to the optical centre as long as the image falls within a focal condition required.

Figure 9:
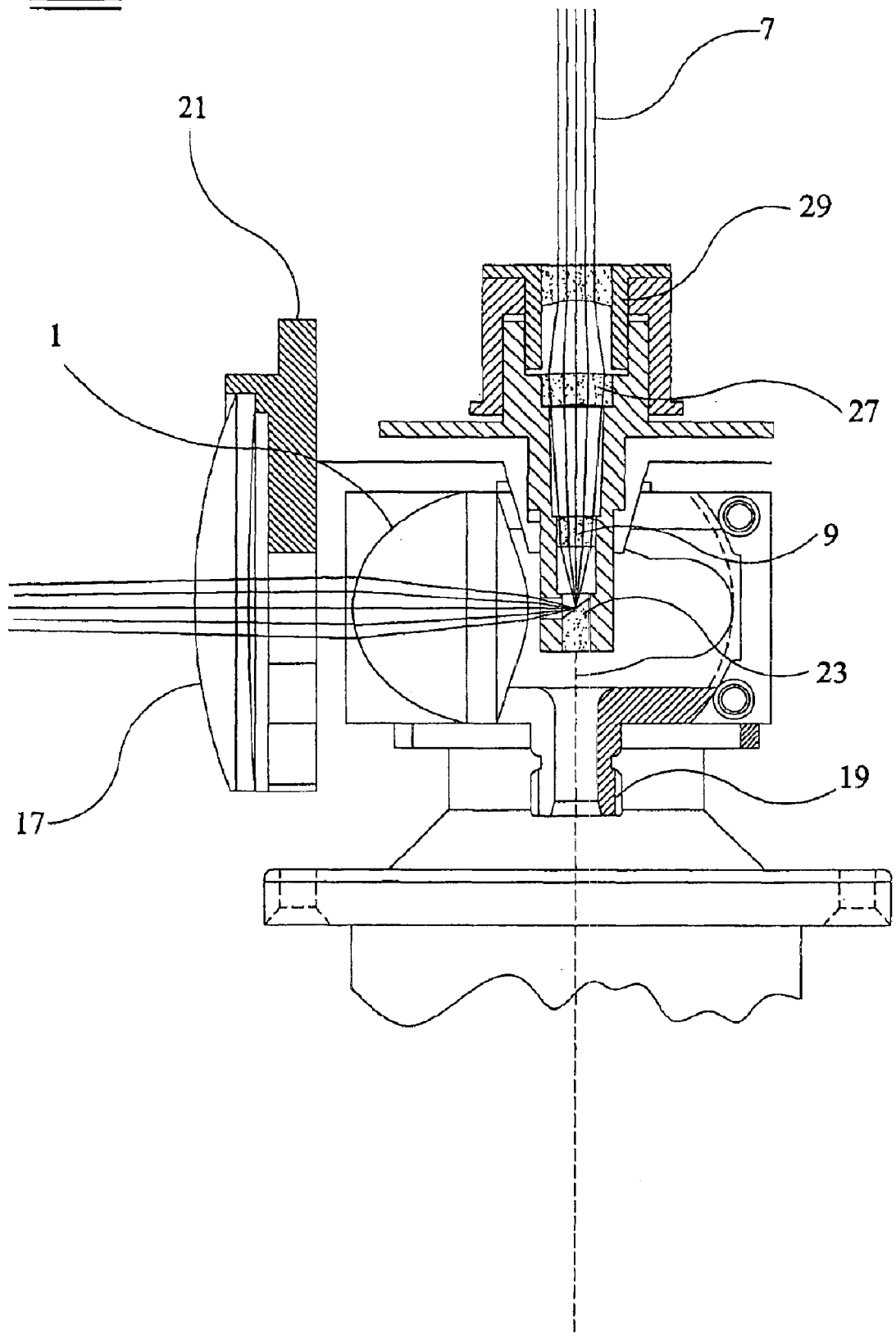
FIG. 9 is a cross-sectional view of another embodiment of a refractive optical deflector according to the present invention.

FIG. 9 shows a modified form of refractive optical deflector incorporating a cluster of three aspheric deflecting lenses 1 which is rotatable about a common axis on which the focal point of all three lenses 1 is located.

The cluster of lenses is rotatable by means of an electric motor, such as an air bearing motor, shown diagrammatically at 19. The motor and the lens cluster are mounted within a housing 21 which is only shown in part with a further aspheric lens 17 mounted in one side of the housing so as to further refract light passing through each of the lenses 1 in turn as the cluster is rotated.

A collimated and monochromatic beam 7 of light enters through the top of the housing 21 and is focussed by a primary focussing lens 9 onto or near an optically flat mirror 23 which is located at 45 degrees and which is axially coincident with the focal point of the lenses 1. The mirror 23 reflects the convergent/divergent beam through 90 degrees along the optical axis of the further lens 17. Thus, as the motor 19 spins the cluster of lenses 1, each lens 1 passes in sequence through the divergent beam with the beam scribing an arc across the width of the lens and is deflected as described hereinabove, the angle of deflection being dependent on the instantaneous rotational position of the lens relative to the beam. The deflected beam 7 then passes through the further lens 17 so as to generate an image on the focal plane.

The refractive optical deflector of FIG. 9 differs from that of FIGS. 6 and 7 primarily in the provision of two further, focus-desensitising lenses 27 and 29 positioned one behind the other in the path of the input beam 7 on that side of the primary focussing lens 9 remote from the mirror 23. The first focus-desensitising lens 27, positioned closer to the primary focussing lens 9 is fixed, while the second focus-desensitising lens 29 is adjustable towards and away from the first lens 27. It has been found that, in high-resolution applications, the system is very sensitive to focus and it is necessary to position and to be able to adjust a single focus lens 9 very accurately. This can be achieved, but is expensive to do so. The alternative shown in FIG. 9 is to provide additional lenses to desensitise the focus. One solution, as shown in FIG. 9, is to provide two further lenses 27 and 29. Lens 27 is a plano-convex lens which is mounted a predetermined distance from the primary focus lens 9, while lens 29 is plano-concave with a curvature substantially similar to that of lens 27 and mounted to move in an axial direction towards and way from lens 27. Although not shown, lens 29 may be mounted in such a way that it is geared with several millimetres of movement towards and away from the lens 27 translating into several microns of movement of the focal point towards and away from the surface of the mirror 23.

It is necessary for all three lenses in the cluster to behave as one, in that they must sequentially scan the same spatial line. It is therefore essential to consider the possibilities for adjusting the lenses relative to the housing in a number of respects: adjustment of focus, adjustment of height, and adjustment of tilt.

Figure 10A:
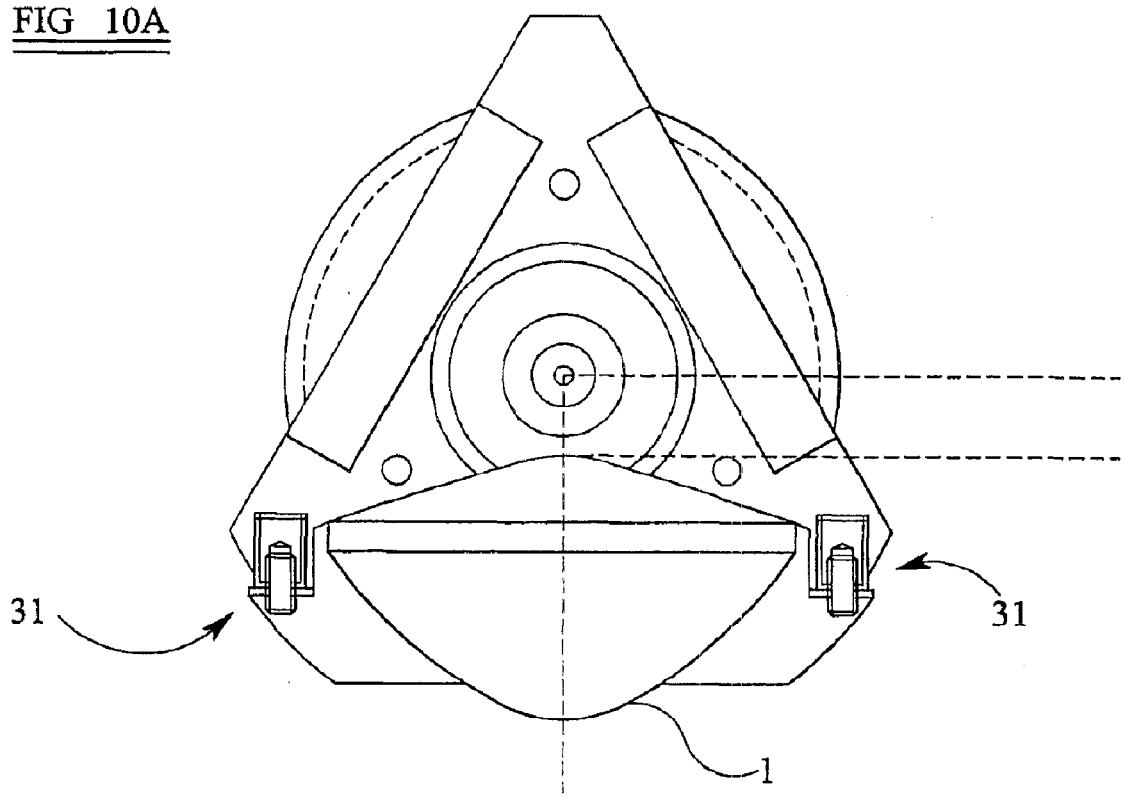
FIGS. 10A and 10B illustrate diagrammatically one means of providing adjustment of focus in the refractive optical deflector shown in FIG. 9.
Figure 10B:
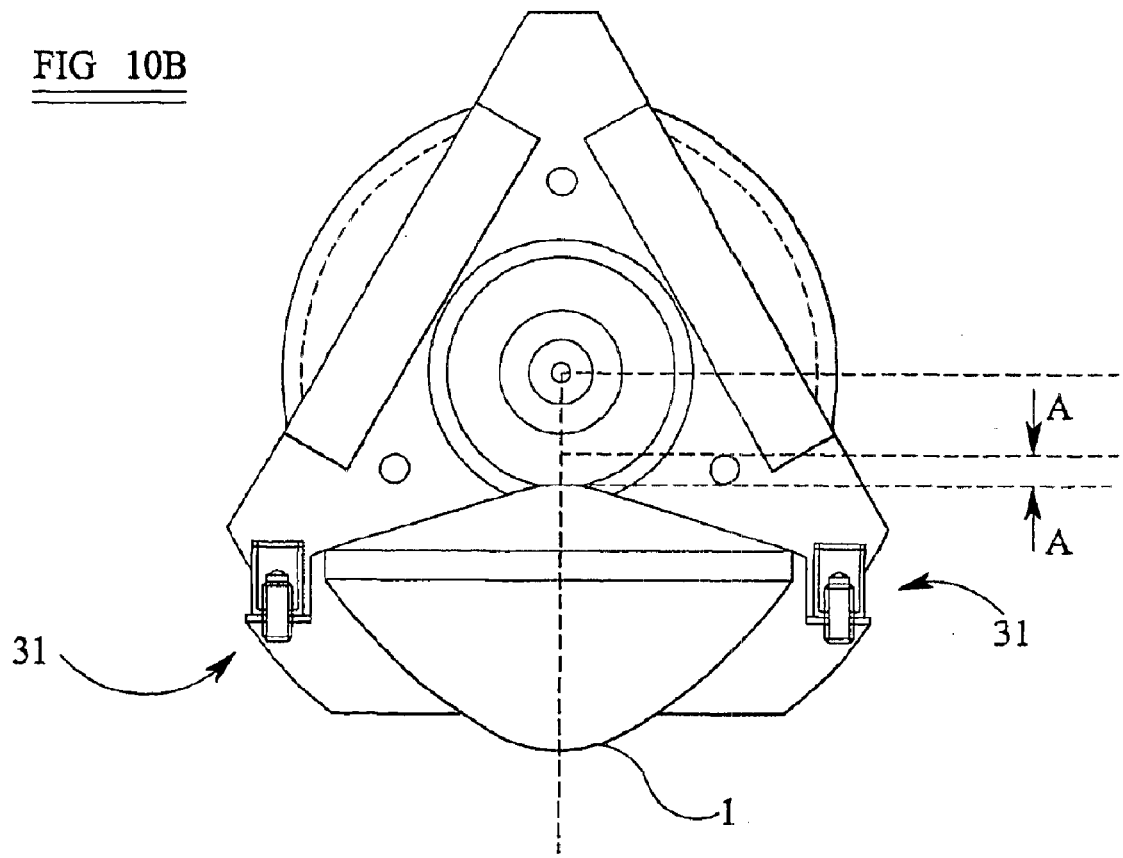

With regard to adjustment of focus, that is distance from the axis of rotation of the cluster, while manual adjustment can be provided it has been found that modern CNC machining techniques are generally sufficiently accurate to dispense with the need to provide adjustment towards and away from the rotational axis. Nevertheless, FIGS. 10A and 10B illustrate diagrammatically one means of providing adjustment of focus with a lens 1 being mounted to the housing by way of an adjusting screw mechanism 31 to allow adjustment towards and away from the axis of rotation as indicated by the arrows A in FIG. 10B. It has also been found that it is generally unnecessary to allow for lateral (sideways) adjustment of the lens relative to the axis of rotation.

Figure 11:
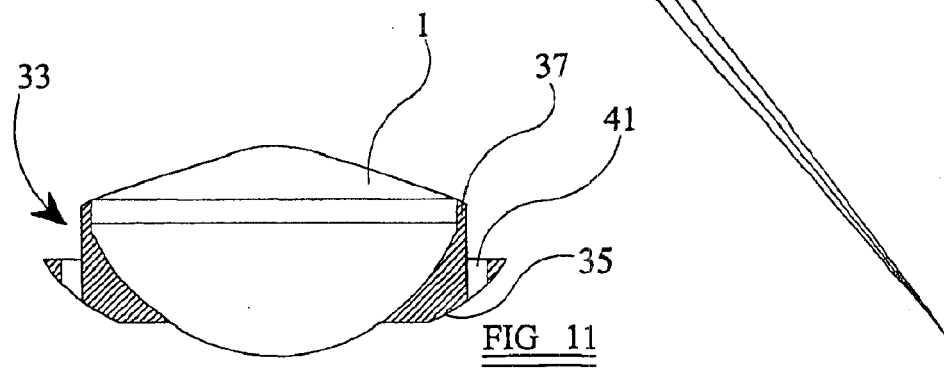
FIG. 11 is a top plan view of a deflecting lens of the refractive optical deflector shown in FIG. 9 mounted in a lens holder.
Figure 12:
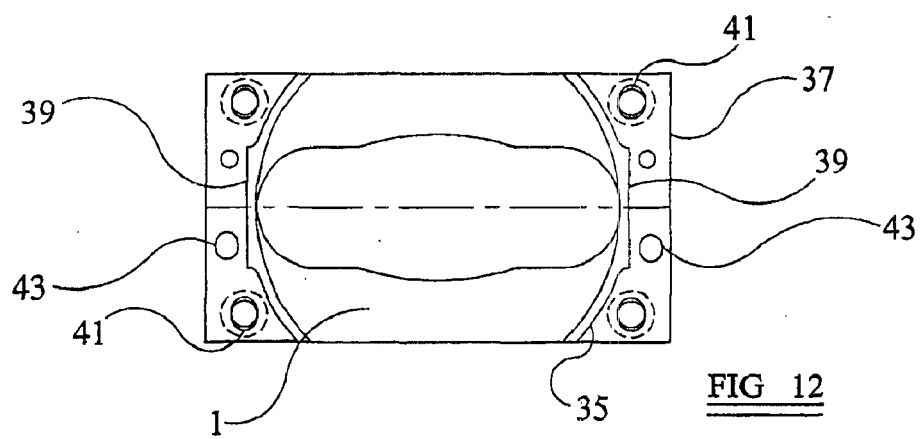
FIG. 12 is a front elevational view corresponding to FIG. 11.

With regard to height adjustment, FIGS. 11 and 12 show the deflecting lens 1 mounted in a holder 33. As can be seen from FIG. 11 the lens holder 33 comprises a rear portion 35 and a forwardly projecting portion 37, the lens 1 fitting closely within a recess formed in the lens holder. As shown in FIG. 12 the forwardly projecting portion 37 is provided with flat sides 39. Apertures 41 are provided in the lens holder 33, the apertures being elongated in a vertical direction to allow relative movement between the lens holder and a fastener extending through each aperture to secure the lens holder to the housing. Additional apertures 43, the apertures being elongated in a vertical direction, are provided to receive a mounting pin provided on a carrier 44 (FIG. 13), while permitting relative movement between the lens holder and the carrier.

Figure 13:
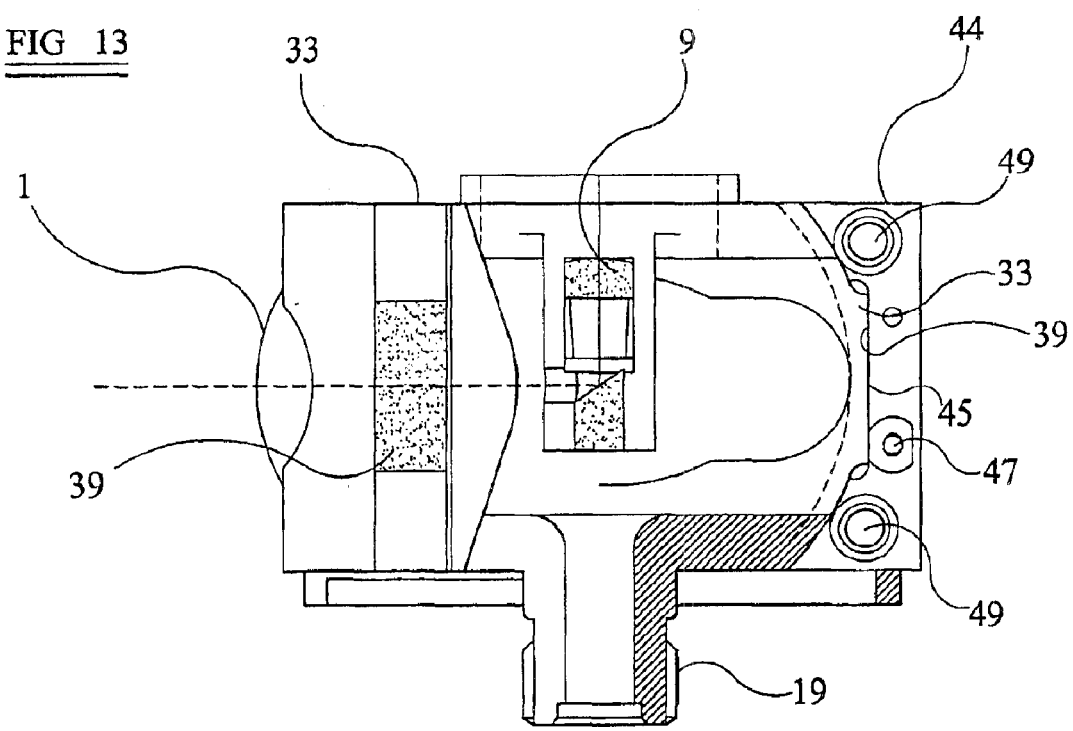
FIG. 13 is a partial cross-section in diagrammatic form illustrating the manner in which a lens holder is mounted to a housing of the refractive optical deflector shown in FIG. 9 for vertical adjustment.

The carrier 44 is partly cut-away for clarity and shows, on the left-hand side of FIG. 13, a flat side 39 of the lens holder 33. The right-hand side of FIG. 13 shows the flat side 39 of the lens holder 33 bearing against a corresponding vertical flat face 45 formed in the carrier 44 so as to constrain movement of the lens holder 33 relative to the carrier. A pin 47 passes through the elongate aperture 43 provided in the lens holder, while fasteners 49 pass through the elongate apertures 41 provided in the lens holder. Thus, the lens holder 33 is able to slide vertically with respect to the carrier, while, during set-up, the adjustment of any single fastener does not give rise to any unwanted displacements due to mechanical moments.

Figure 14:
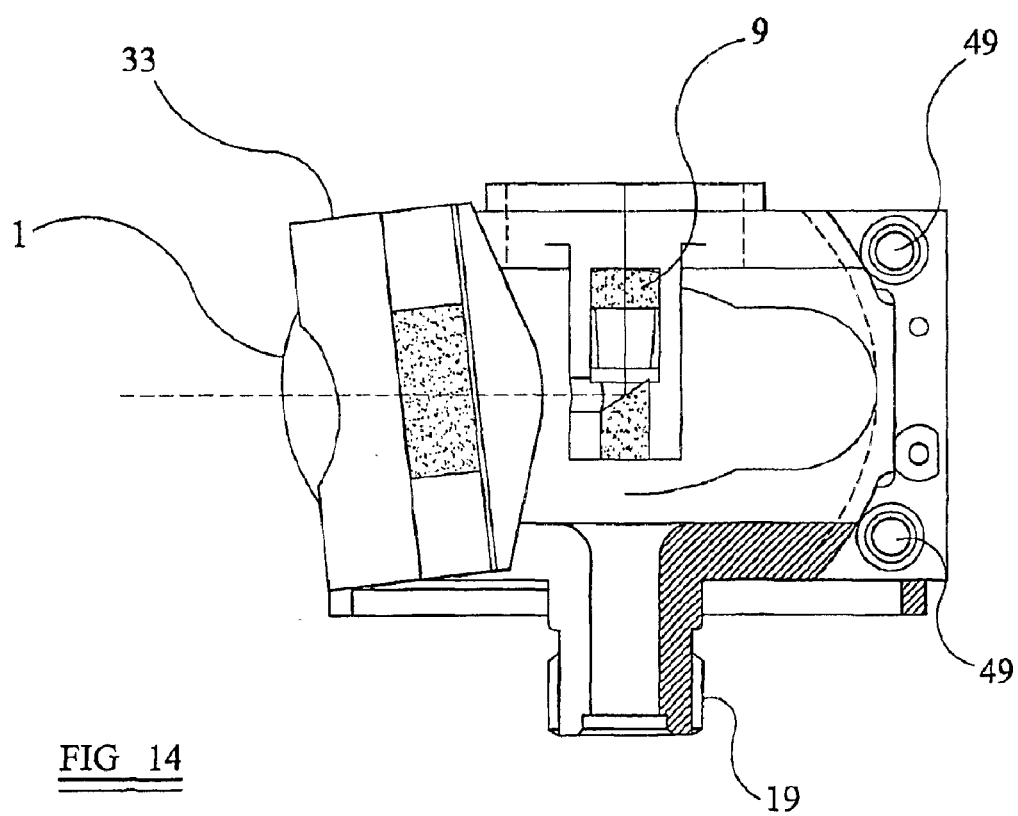
FIG. 14 is a partial cross-section in diagrammatic form illustrating the manner in which a lens holder is mounted to a housing of the refractive optical deflector shown in FIG. 9 for tilt adjustment.

A further form of adjustment found to be important is tilt adjustment of the deflecting lens relative to the carrier. It has been found that there will always be a tolerance associated with height adjustment and that this results in coma of the pixel towards the end of a line scan. If the beam is passed through the deflecting lens marginally off-axis, then coma will arise and the resultant comatic focus is displaced with respect to the required axis. It has further been found that tilt adjustment of the deflector lens can be used to correct the error. In effect a combination of height error and compensating tilt can result in a substantially perfect pixel. This is because the comatic flare introduced by tilt is oriented in the opposite direction to that introduced by height error. Tilt adjustment is shown diagrammatically in FIG. 14 and is effected by differential adjustment of the upper and lower fasteners 49.

Figure 15:
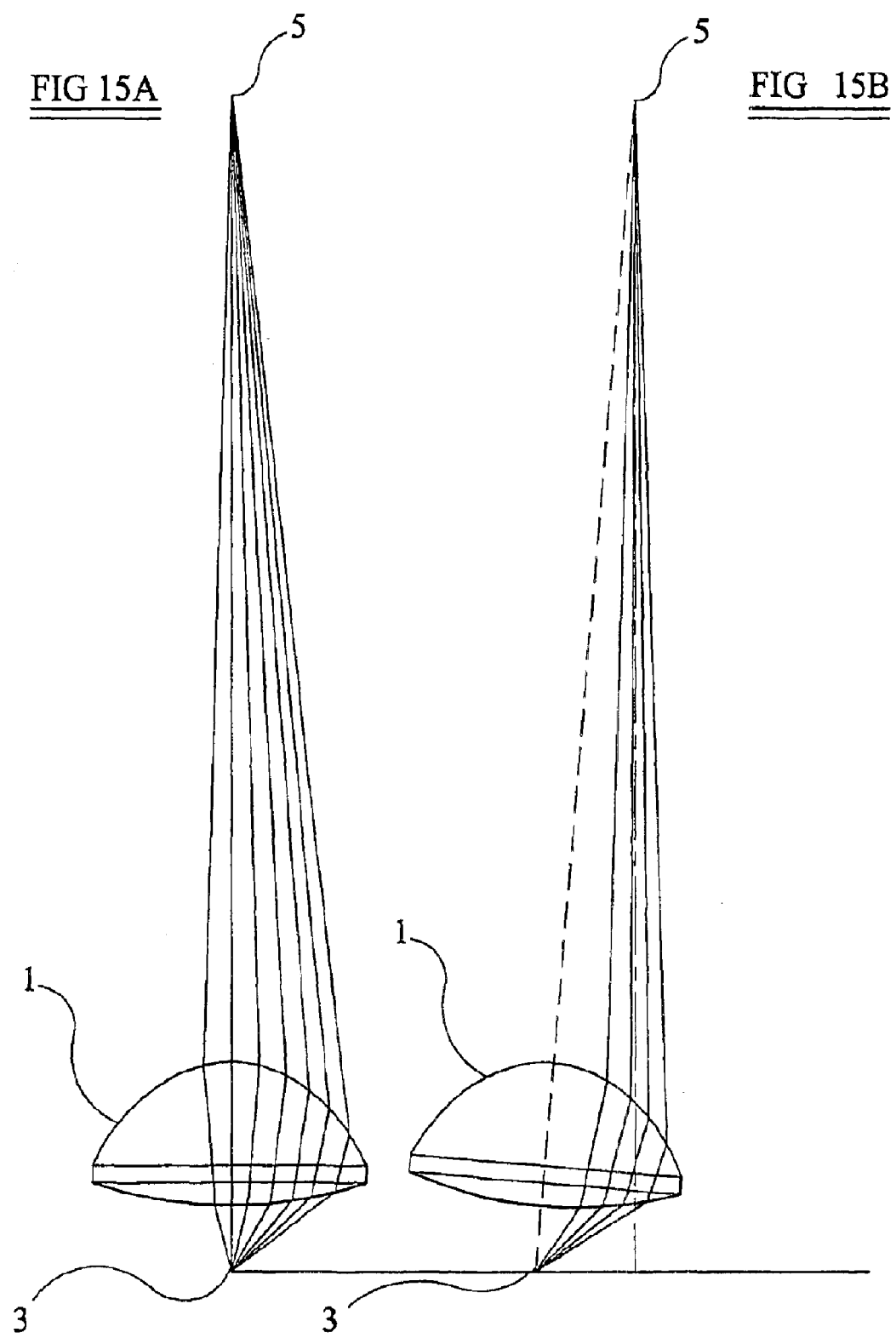
FIGS. 15A and 15B show how the refractive optical deflector according to the present invention can be used as a scanning microscope.

FIGS. 15A and 15B show how the refractive optical deflector according to the present invention can be used as a scanning microscope. In this case, the deflecting lens 1 is effectively reversed such that the shorter focal length of the lens corresponds to the outer focal point 3 and the longer focal length corresponds to the inner focal point 5. Nevertheless, the deflecting lens is still rotated about the inner focal point 5 in order to scan the target at the outer focal point 3.

Figures 16, 17:
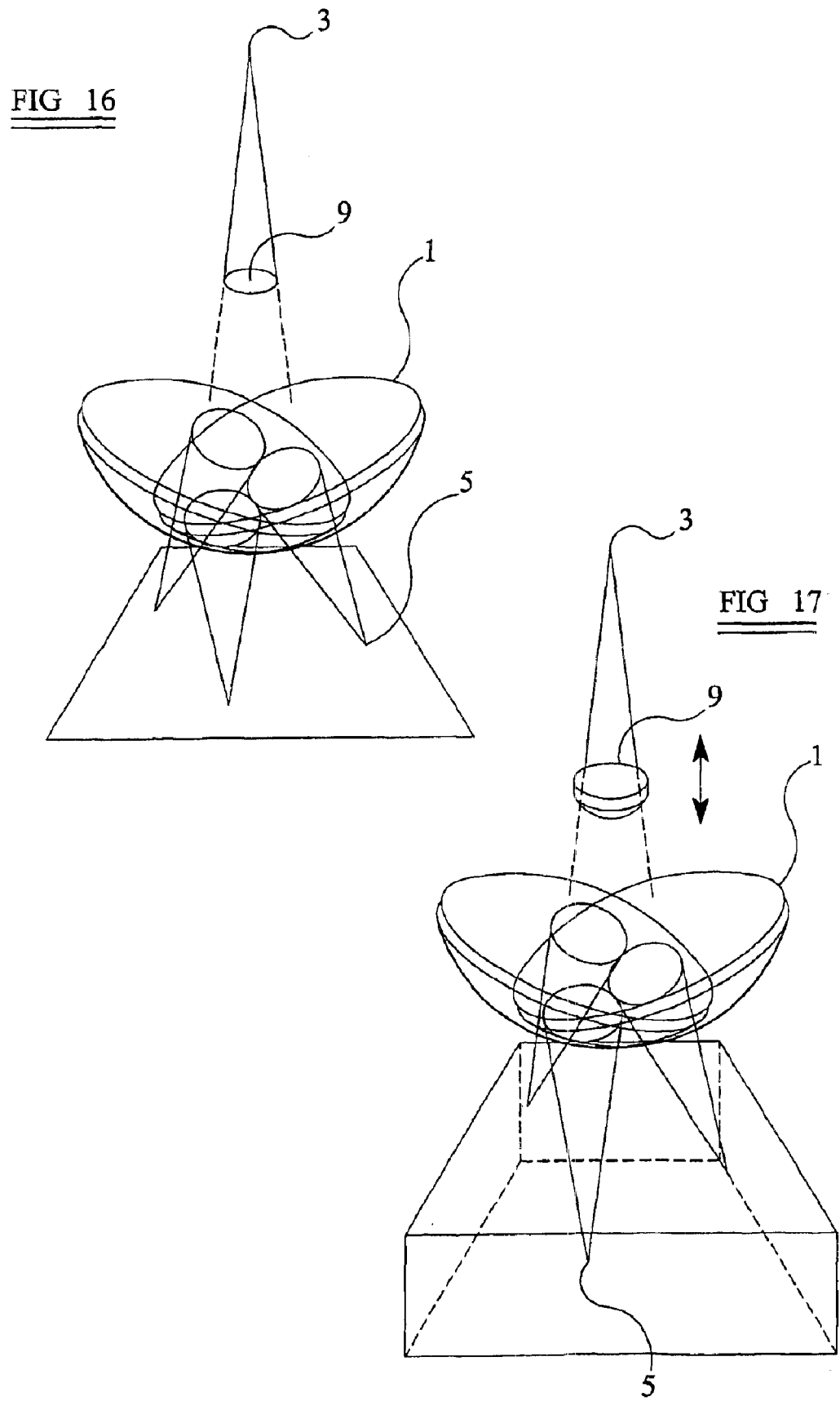
FIG. 16 shows how the refractive optical deflector according to the present invention can be employed as a two dimensional scanner.
FIG. 17 shows how the refractive optical deflector according to the present invention can be employed as a three dimensional scanner.

FIG. 16 is not to scale, but shows how the refractive optical deflector according to the present invention can be employed as a two dimensional scanner. In effect, all that is required is to enable the carrier 44 to be rotatable about a horizontal axis passing through the focal point 3. In this way the deflector lens 1 is able to move spherically rather than in a circular manner and the entire lens can be used for imaging purposes. The advantage is that the light source or the light detector remains spatially fixed and only the lens moves.

FIG. 17 is not to scale, but shows how the refractive optical deflector according to the present invention can be employed as a three dimensional scanner. In effect, all that is required over and above the embodiment of FIG. 16 is to make the lens 9 adjustable in order to refocus the focal plane 5. It will be noted that both the light source, or detector, and the target remain stationary and only the lens 9 requires to be adjusted in order to image the target. The advantage is that relatively large regions can be imaged with both the target and the detector stationary which is particularly useful in certain applications, such as forensic examinations.

The optical deflector according to the present invention can have the following advantages:

By refracting the beam or image through a lens rather than reflecting it off a mirror, many of the optical components of a reflecting deflector can be combined. In this way a significant number of costly components can be eliminated. According to the refracting optical deflector of the present invention, from light source to focal plane as few as two lenses may be required, although further, non-specialist lenses may be required for demanding high-resolution applications.

In addition, because the ratio of focal length to deflection angle can be very high, high duty cycles can be obtained. Typically, a duty cycle of about 70 percent can be achieved in high-resolution applications, and up to about 95 percent duty cycle can be achieved in less demanding applications. This is more than twice the duty cycle of equivalent galvanometer and polygon deflectors.

With deflection angles typically of 90 degrees, and up to 120 degrees, optical deflectors according to the present invention can be much more compact than prior art deflectors. A typical optical deflector according to the present invention may have an overall focal length of from ½ to ⅔ of that of traditional scanning optics. Further, without the need for beam expanders and F-theta lenses, the mechanical distance from light source to deflector lens need only be a few centimetres.

Although wide deflection angles and short focal lengths would normally give rise to a high degree of pixel ellipticity, in the optical deflector according to the present invention the deflecting lens can readily be designed in such a way that the divergence angle changes with deflection angle so as to substantially fully correct for this error in a way that traditional F-theta lenses cannot.

Because the optical deflector is in the form of a spinning optic, scan speed is limited only by two parameters: analog-digital conversion time and centripetal forces of the spinning lenses. In the case of a galvanometer-based scanner, inertia limits the resonance frequency of the scanner to from 200 Hz to 400 Hz depending on mirror size and the duty cycle is typically less then 40 percent. In contrast, the optical deflector according to the present invention can function at up to nearly 1 kHz, with an optical duty cycle of about 75 percent. Plate expose, for example, would be several times faster because the electronic systems are not limited to the low resonance frequencies of galvanometer-based scanners and are able to function at higher speeds and for a longer period of time per scan line.

Scanning optics have traditionally been limited to one dimension. However, the optical deflector according to the present invention need not be restricted to functioning in a single plane. The deflecting lenses may be mounted so as to be rotationally symmetrical about an axis and, in addition to being able to rotate at high speed about the rotational axis, may be made to rotate through, say, 90 degrees. The additional rotation results in a true two dimensional scanner while eliminating the carriages and rollers normally associated with scanner mechanisms.

The optical deflector may incorporate a dynamic focus optic and in which case the focal plane need not be flat. Thus, the optical deflector can provide true three dimensional scanning capabilities. Although not required in conventional scanning applications, such a capability can be used, for example, to map a focussed laser onto a three dimensional surface. Conversely, an image can be read without the need to make mechanical movements. For instance, in the case of microscopy it is traditional to move the stage carrying the target in X and Y directions using microadjusters, whereas an optical deflector according to the present invention allows three dimensional surfaces to be mapped by moving the lens rather than the target to image a different view.

Whatever the nature of the required focal plane, the optical deflector according to the present invention can readily be designed to accommodate the shape of the focal plane either by modifying the deflecting lens to provide a fixed, or "built-in", focal condition, or by dynamic refocussing. Dynamic refocussing is limited only in that high-speed, dynamic focal plane scanning requires the use of expensive piezo-electric actuators to achieve focus.

In non-scanning applications, when the deflecting lens does not spin, but remains rotatable, the deflecting lens becomes an unusual imaging lens in its own right. For example, the deflecting lens can be mounted effectively as a ball joint with a detector array, such as a CCD array, fixed in space. In this way, a conventional alt-azimuth camera mount is not required and the single deflecting lens can be moved hemispherically to image a 120 degree field of view.

What is claimed is:

1. An optical deflector comprising a deflecting lens (1, 13) having a first aspheric lens surface of positive optical power and having a first focal length giving rise to a first focal point (3) and a second aspheric lens surface of positive optical power and having a second focal length giving rise to a second focal point (5), the first focal length being shorter than the second focal length, whereby a divergent beam (7) of light substantially at one of the first and second focal points is focussed by the lens at the other of the first and second focal points, means (19) adapted to rotate the lens about an axis substantially perpendicular to an optical axis of the lens and substantially coincident with one of the first and second focal points, and a focussing lens (9) provided in a light path extending on that side of the first focal point (3) remote from the lens (1, 13) and adjustable so as to alter the depth of the second focal point.

2. An optical deflector as claimed in claim 1, wherein the lens (1, 13) is shaped to increase beam divergence with increasing scan angle.

3. An optical deflector as claimed in claim 1, wherein the or each lens (1, 13) is rotatable continuously about the axis.

4. An optical deflector as claimed in claim 1, wherein the or each lens (1, 13) is reciprocable about the axis.

5. An optical deflector as claimed in claim 1, wherein the lens (1, 13) is rotationally symmetrical.

6. An optical deflector as claimed in claim 1, wherein the lens (1, 13) is cylindrico-aspheric.

7. An optical deflector as claimed in claim 1 and including at least one focus-desensitising means (21, 29) at that side of the focussing lens (9) remote from the deflecting lens (1, 13).

8. An optical deflector as claimed in claim 7, wherein the focus-desensitising means comprises a first stationary focus-desensitising lens (27) and a second focus-desensitising lens (29) movable in the axial direction.

9. An optical deflector as claimed in claim 8, wherein the second focus-desensitising lens (29) is at that side of the first focus-desensitising lens (27) remote from the focussing lens (9).

10. An optical deflector as claimed in claim 1, wherein the lens (1, 13) is rotatable about an axis substantially coincident with the first focal point (3).

11. An optical deflector as claimed in claim 10, wherein the lens (1, 13) is shaped to determine the configuration of the focal plane including the second focal point (5).

12. An optical deflector as claimed in claim 10, wherein a further, stationary aspheric lens (17) is positioned intermediate the deflecting lens (1, 13) and the second focal point (5).

13. An optical deflector as claimed in claim 12, wherein the first focal point (3) lies on the optical axis of the further lens (17).

14. An optical detector as claimed in claim 12, wherein the further lens (17) shaped to determine the configuration of the focal plane including the second focal point (5).

15. An optical deflector as claimed in claim 12, wherein the further lens (17) is rotationally symmetrical.

16. An optical deflector as claimed in claim 12, wherein the further lens (17) is cylindrico-aspheric.

17. An optical deflector as claimed in claim 10, wherein a plurality of lenses (1, 13) are provided, each rotatable about an axis substantially coincident with a common first focal point.

18. An optical deflector as claimed in claim 17, wherein the lenses (1, 13) are arranged in a cluster.

19. An optical deflector as claimed in claim 18, wherein the cluster comprises three equiangularly spaced lenses (1, 13).

20. An optical deflector as claimed in claim 18 and including means (31) for adjusting each lens (1, 13) towards and away from the axis of rotation.

21. An optical deflector as claimed in claim 18 and including means (39, 45) for adjusting each lens (1, 13) in a direction parallel to the axis of rotation.

22. An optical deflector as claimed in claim 18 and including means (39, 45, 49) for adjusting tilt of each lens (1, 13) relative to the axis of rotation.

23. An optical deflector as claimed in claim 10, wherein the divergent beam (7) of light originates substantially from the first focal point (3).

24. An optical deflector as claimed in claim 10 and including a source of collimated light.

25. An optical deflector as claimed in claim 24, wherein the source of collimated light comprises a source of laser light.

26. An optical deflector as claimed in claim 10, wherein the divergent beam (7) of light originates substantially from the second focal point (5).

27. An optical deflector as claimed in claim 26 and including an optical detector located substantially at the first focal point (3).

28. An optical deflector as claimed in claim 27, wherein the optical detector comprises an array of detectors.

29. An optical deflector as claimed in claim 28, wherein the array of detectors comprises a linear array CCD sensor.

30. An optical deflector as claimed in claim 1, wherein the lens (1, 13) is rotatable about an axis substantially coincident with the second focal point (5).

31. An optical deflector as claimed in claim 1, wherein the arrangement is such that a light path between the first and second focal points includes only a single rotatable deflecting lens.

32. An optical deflector as claimed in claim 1, wherein the focussing lens is adjustable by means of piezo-electric actuators.

* * * * *